US010163530B2

(12) United States Patent
Ranc et al.

(10) Patent No.: US 10,163,530 B2
(45) Date of Patent: Dec. 25, 2018

(54) NUCLEAR REACTOR WITH SCREW-NUT DRIVE OF CORE REACTIVITY CONTROL MEMBERS

(71) Applicant: Société Technique pour l'Energie Atomique, Villiers le Bacle (FR)

(72) Inventors: Lionel Ranc, Pertuis (FR); Charles Dumanois, Rians (FR); Jean-Luc Rouiller, Saint-Cannat (FR)

(73) Assignee: SOCIÉTÉ TECHNIQUE POUR L'ENERGIE ATOMIQUE, Villiers le Bacle (FR)

( * ) Notice: Subject to any disclaimer, the term of this patent is extended or adjusted under 35 U.S.C. 154(b) by 0 days.

(21) Appl. No.: 15/748,182

(22) PCT Filed: Jul. 28, 2016

(86) PCT No.: PCT/EP2016/068114
§ 371 (c)(1),
(2) Date: Jan. 27, 2018

(87) PCT Pub. No.: WO2017/017242
PCT Pub. Date: Feb. 2, 2017

(65) Prior Publication Data
US 2018/0226161 A1 Aug. 9, 2018

(30) Foreign Application Priority Data
Jul. 29, 2015 (FR) ...................................... 15 57278

(51) Int. Cl.
*H04B 1/38* (2015.01)
*G21C 7/14* (2006.01)
(Continued)

(52) U.S. Cl.
CPC ................. *G21C 7/14* (2013.01); *G21C 1/32* (2013.01); *G21C 7/12* (2013.01); *G21C 9/02* (2013.01);
(Continued)

(58) Field of Classification Search
CPC ... G21C 7/14; G21C 9/02; G21C 1/32; G21C 7/113; G21C 15/02
(Continued)

(56) References Cited

U.S. PATENT DOCUMENTS 4,618,471 A * 10/1986 Defaucheux ............. G21C 7/12
294/86.29
5,517,536 A * 5/1996 Goldberg ................. G21C 7/16
376/228
(Continued)

FOREIGN PATENT DOCUMENTS

EP      0 034 517 A2    8/1981

OTHER PUBLICATIONS

Search Report of PCT International Phase.

*Primary Examiner* — Dhaval Patel
(74) *Attorney, Agent, or Firm* — Davidson, Davidson & Kappel, LLC

(57) ABSTRACT

A nuclear reactor includes a plurality of mechanisms (11) that drive the contact members (9) that control the reactivity, of the core. Each mechanism includes a driving member (21) including a driving part (23) forming one out of a screw or a nut, a member (27) for applying a rotary torque of the rotor (19) to the driving member (21), a driven member (29) translationally connected to one of the control members (9) and including the other out of screw and a nut; and a member (33) that is selectively mobile between a position of blocking the driving member (21) and a position of releasing the driving member (21). In each drive mechanism (11), the
(Continued)

motor (15) is fully immersed in the primary coolant inside the vessel (3); the rotor (19) has a central passage (35), the member for applying the rotary torque (27) being situated in or near the central passage (35); the driving member (21) includes a connecting part (37) engaged in the central passage (35) and collaborating with the member for applying the rotary torque (27), the connecting part (37) being free to effect a translational movement inside the central passage (35) with respect to the rotor (19) when the or each blocking member (33) is in the releasing position.

11 Claims, 2 Drawing Sheets

(51) Int. Cl.
    *G21C 1/32*     (2006.01)
    *G21C 7/12*     (2006.01)
    *G21C 9/02*     (2006.01)
    *G21C 7/113*     (2006.01)
    *G21C 15/02*     (2006.01)

(52) U.S. Cl.
    CPC .............. *G21C 7/113* (2013.01); *G21C 15/02* (2013.01); *Y02E 30/39* (2013.01)

(58) Field of Classification Search
    USPC ........ 375/258, 295, 296, 316; 376/209, 219, 376/229, 223, 239
    See application file for complete search history.

(56) References Cited

U.S. PATENT DOCUMENTS

| | | |
|---|---|---|
| 2010/0316177 A1 | 12/2010 | Stambaugh et al. |
| 2011/0222640 A1* | 9/2011 | DeSantis .................. G21C 7/14 376/229 |
| 2015/0139380 A1 | 5/2015 | Lee et al. |

* cited by examiner

NUCLEAR REACTOR WITH SCREW-NUT DRIVE OF CORE REACTIVITY CONTROL MEMBERS

The invention generally relates to nuclear reactors, and in particular to the drive mechanisms of the members controlling the reactivity of the core.

More specifically, the present disclosure relates to a nuclear reactor of the type comprising:
- a vessel having a center axis, containing a primary liquid;
- a plurality of nuclear fuel assemblies, forming a core placed in the vessel;
- a plurality of members for controlling the reactivity of the core;
- a plurality of drive mechanisms of the control members parallel to the center axis;
- wherein each drive mechanism comprises:
- a motor comprising a stator and a rotor that may be rotated by the stator;
- a driving member comprising a driving part forming one of a screw or a nut;
- a device for connecting in rotation the member driving the rotor, and having a member for applying a rotary torque of the rotor to the driving member;
- a driven member connected in translation to one of the control members and comprising the other of a screw or a nut, wherein the screw and the nut interact so that rotation of the driving member with respect to the stator is in the form of a translation of the member driven parallel to the center axis with respect to the stator;
- a blocking device comprising at least one selectively movable blocking member between a blocking position in which the drive member is blocked in translation parallel to the center axis relative to the rotor, and a releasing position in which the driving member and the driven member are free in translation parallel to the center axis with respect to the rotor between an extreme high position and an extreme low position.

BACKGROUND

Such a nuclear reactor is known from EP0034517. The drive mechanisms of this reactor are located outside the vessel, so that the nuclear reactor has a significant height. Moreover, these mechanisms have significant diameters, so that the number of control members that may be implemented in the nuclear reactor is greatly limited. This is particularly problematic when the nuclear reactor operates with a primary liquid free of boron.

SUMMARY OF THE INVENTION

In this context, the invention aims to provide a nuclear reactor that solves the above problem.

To this end, a nuclear reactor of the aforementioned type is provided, characterized in that in each drive mechanism:
- the motor is fully immersed in the primary liquid inside the vessel;
- the rotor has a central passage, wherein the member for applying the rotary torque is located in or near the central passage;
- the driving member comprises a connecting part engaged in the central passage and interacting with the rotary torque application member, wherein the connecting part is free in translation in the central passage relative to the rotor when the, or each, blocking member is in the releasing position.

Because the drive mechanisms are fully immersed in the primary liquid inside the vessel, the total height of the nuclear reactor is reduced, since it no longer has structures projecting above the vessel.

Furthermore, the member for applying the torque of the rotor to the driving member is located very close to the rotor, or even in the internal passage of the rotor. In EP0034517, the member for applying the torque of the rotor to the driving member is situated at a significant distance from the rotor. The drive mechanism of EP0034517 must include a hollow shaft transmitting the torque of the rotor to the rotational torque application member. The mechanism also has to provide a guide in rotation of the hollow shaft, because of the significant cantilever separating the rotor from the rotary torque application member. Such an arrangement significantly increases the radial size of the drive mechanism. These constraints are eliminated in the present disclosure because of the position of the rotary torque application member.

Furthermore, the fact that the driving member comprises a connecting part free in translation in the central passage in the event of release, means that the motor does not contribute to the total height of the drive mechanism. The latter depends on the respective lengths of the driving member and the driven member and the extreme high position. Thus, it is possible to arrange the coils of the rotor and the stator in such a manner as to minimize the outer diameter of the motor, by distributing the conductors over a greater height.

The diameter of the drive mechanism may thus be smaller than the pitch of the fuel assemblies, so that it is possible to provide up to one drive mechanism for each fuel assembly.

The nuclear reactor may also have one or more of the following characteristics considered individually or in any technically feasible combination:
- the connecting part of the driving member comprises a first section interacting with the member for applying the rotary torque in the extreme high position, and a second section interacting with the member for applying the rotary torque in the extreme low position;
- a reactor as described above, wherein the rotary torque application member comprises a plurality of rotatable elements capable of rolling along the connecting part when the connecting part moves parallel to the center axis;
- the connecting part has at least one flat side on the section perpendicular to the center axis;
- the passage is delimited by a peripheral wall separated from the connecting part by a gap with a width greater than 10 mm;
- the, or each, blocking member is mounted on a support integral with the rotor;
- the blocking device comprises at least one polar mass connected to the, or one of the, blocking member(s) and at least one electromagnetic coil interacting with the, or each, polar mass, wherein the, or each, electromagnetic coil is fixed in translation and in rotation with respect to the stator;
- the blocking device comprises at least one elastic member interposed between the driving member and the support, and urging the driving member to the extreme low position.
- each drive mechanism comprises a device for guiding the driven member in translation and blocking the driven member in rotation relative to the stator;
- each drive mechanism comprises an upper frame on which the motor and the blocking device are mounted, and a lower frame on which is mounted the device for guiding in translation and blocking in rotation, wherein the upper and lower frames are fixed in a removable manner to each other so that the lower frame is closer to the core than the upper frame;

the screw and the nut constitute an irreversible connection, arranged so that a vertical bias applied to the driven member is not converted into a rotational movement of the driving member.

BRIEF SUMMARY OF THE DRAWINGS

Other features and advantages of the invention will become clear from the detailed description that is given below for information only and is in no way limiting, with reference to the appended figures, wherein.

DETAILED DESCRIPTION

Figure 1:
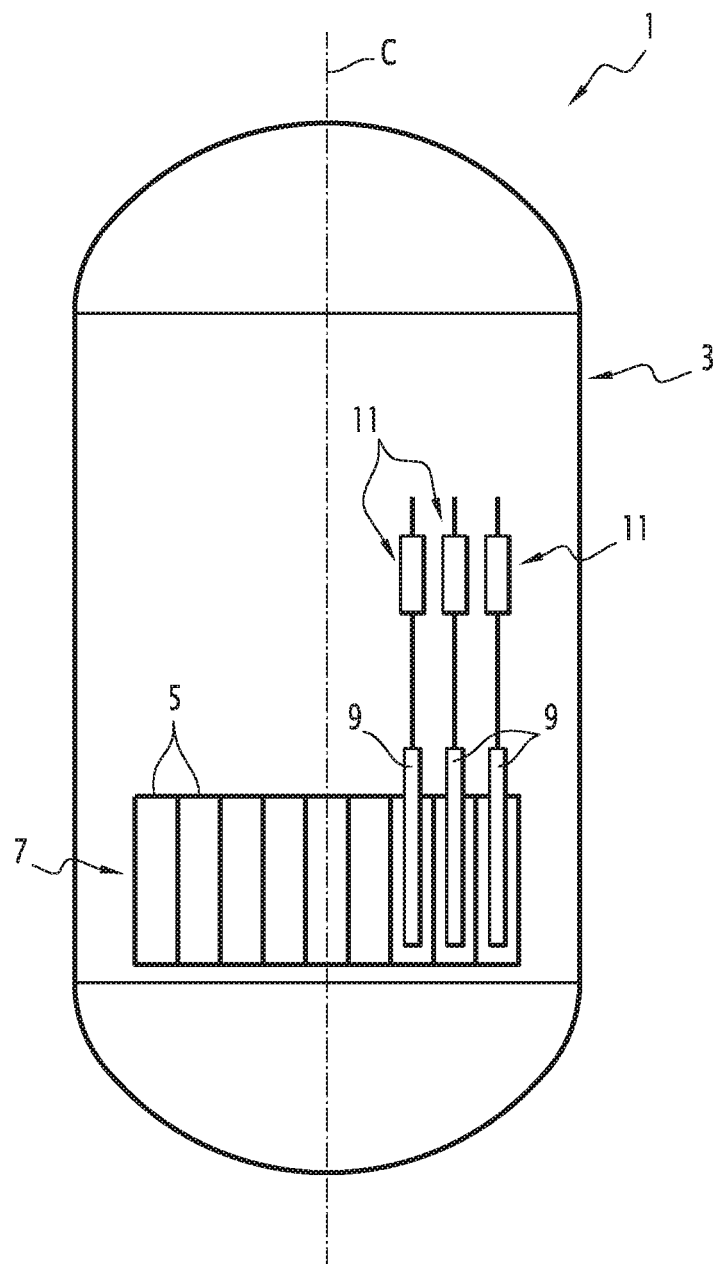
FIG. 1 shows a simplified schematic representation of a nuclear reactor according to an embodiment of the invention.

The nuclear reactor 1 shown in FIG. 1 is a reactor known by the acronym SMR (Small and Medium Reactor). This type of reactor equips, for example, small nuclear facilities, with a power of a few hundred MWe. This reactor is typically of the pressurized water type (PWR). Alternatively, the reactor may be of the boiling water type (BWR).

The reactor 1 comprises a vessel 3 having a center axis C, a plurality of nuclear fuel assemblies 5 forming a core 7 placed in the vessel 3, a plurality of core reactivity controllers in the form of members 9 for controlling the reactivity of the core 7, and a plurality of mechanisms 11 for driving the control members 9 parallel to the center axis C.

In FIG. 1, only a small number of nuclear fuel assemblies, control members and drive mechanisms are shown. In reality, each nuclear reactor comprises a large number of nuclear fuel assemblies and likewise a large number of control members and drive mechanisms.

The center axis C is typically vertical or substantially vertical. The vessel 3 is substantially cylindrical around the center axis C.

The vessel 3 contains the primary liquid of the nuclear reactor. Typically, in an SMR type reactor, the pressurizer and the steam generator(s) is/are housed inside the vessel 3. These elements are not shown in FIG. 1.

The nuclear fuel assemblies 5 are elongated elements parallel to the center axis, of prismatic shape, and placed against each other.

The members 9 for controlling the reactivity of the core are known under the name of control rod or control element. Each comprises a part made of a neutron-absorbing material. Each control member is of elongated shape parallel to the center axis C, and with a section adapted to allow the insertion of the control member in a channel arranged in the center of a nuclear fuel assembly 5.

Each drive mechanism 11 is intended to move one of the control members parallel to the center axis C, in order to remove it completely from the corresponding nuclear fuel assembly 5, or to insert it by a given length inside the nuclear fuel assembly.

Figure 2:
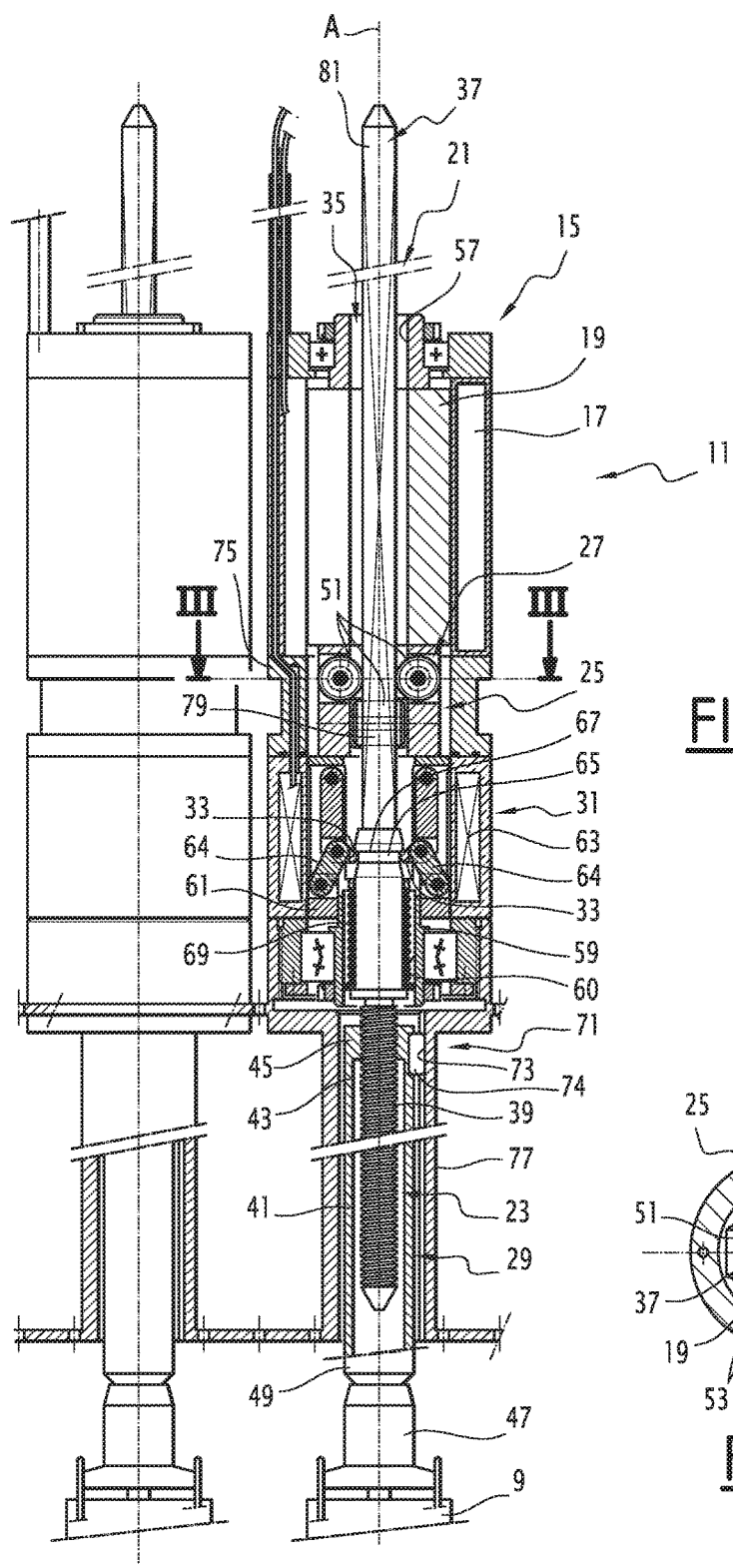
FIG. 2 shows a detailed representation, in section, of the drive mechanism of a core reactivity control element of the nuclear reactor of FIG. 1.

As may be seen in FIG. 2, each drive mechanism 11 comprises:

a motor 15 comprising a stator 17 and a rotor 19 capable of being rotated by the stator 17;

a driving member 21 comprising a driving part 23 forming one of a screw or a nut;

a connector in the form of a connecting device 25 for rotating the driving member 21 with the rotor 19, and having a torquer in the form of a member 27 for applying a rotational torque of the rotor to the driving member;

a driven member 29 connected in translation to one of the control members 9 and comprising the other of a screw or a nut;

a blocking device 31, comprising at least one blocker in the form of a blocking member 33 selectively movable between a locking position in which the drive member 21 is locked in translation parallel to the center axis C relative to the rotor 19, and a releasing position in which the driving member 21 and the driven member 29 are free in translation parallel to the center axis C relative to the rotor 19.

The motors 15 are fully immersed in the primary liquid inside the vessel. More generally, the drive mechanisms 11 are completely immersed in the primary liquid inside the vessel 3. This means that, unlike EP0034517, none of the elements of the drive mechanism protrude outside the vessel 3. In particular, the motor 15, the driving members 21, the driven members 29, and the blocking device 31 are immersed in the primary liquid inside the vessel 3. Typically, all these elements are immersed permanently in the primary liquid.

Only electrical conductors connecting the drive mechanism to a source of electrical power or electronic detection devices exit the vessel.

The stator 17 has a cylindrical shape, and has an axis A parallel to the center axis C.

The rotor 19 is arranged inside the stator 17, and has a cylindrical shape coaxial with the axis A. It has a central passage 35, extending along the axis A.

The driving member 21, in addition to the driving part 23, comprises a connecting part 37 engaged in the central passage 35. The driving member 21 is a rod of significant length parallel to the center axis C, wherein the driving part 23 constitutes the lower part of the rod, while the connecting part 37 constitutes the upper part of the rod.

The driving part 23 is integral with the connecting part 37.

In the present description, the terms inferior and superior, the top and the bottom, the upper and the lower, are understood relative to a vertical direction, corresponding substantially to the center axis C.

In the example shown, the driving part 23 forms a screw bearing an external thread 39. This thread extends substantially over the entire length of the driving part 23.

In this case, the driven member 29 comprises a tubular part 41, wherein the upper end 43 of the tubular part carries a nut 45. The nut 45 has an internal thread interacting with the external thread 39 of the screw.

Alternatively, the driving part 23 carries a nut and the driven member 29 has a part forming a screw and interacting with the nut.

The screw 23 and the nut 45 thus interact in such a manner that rotation of the driving member 21 relative to the stator 17 results in a translation of the driven member 29 parallel to the center axis C relative to the stator 17. The interaction of the screw and the nut in normal operation allows the insertion position of the control member 9 in the corresponding fuel assembly 5 to be controlled. Normal operation corresponds to the situation where the blocking member(s) is/are in the locked position.

The tubular part 41 has a length parallel to the center axis that is substantially equal to that of the screw 23. Thus, the screw 23 may be received inside the tubular part 41, over all or part of its length, as a function of the position of the nut 45 along the screw 23. The length of the screw corresponds to the maximum stroke of the control member 9 in normal operation.

Furthermore, the driven member 29 comprises a fastener 47 connecting the driven member 30 to the control member 9. The fastener 47 is carried by the lower end 49 of the tubular part 41.

The rotary torque application member 27 is provided to transmit a rotary torque from the rotor 19 to the driving member 21. The term "application member" as used here refers to the part of the connecting device 25 interacting directly with the driving member 21, and, more specifically, with the connecting part 37 thereof.

Advantageously, the application member 27 comprises a plurality of rotary elements 51 able to roll along the connecting part 37 when the latter moves parallel to the center axis.

For example, the rotating elements 51 may be rollers. Alternatively, these may be balls or any other type of rotating elements. In another variant, the connection between the rotor 19 and the driving member 21 is provided without a rotary element by means of a male square type connection (rotor side 19)/female square type connection (driving member side 21).

The rotating elements are connected to the rotor 19. They are rotatable about respective axes each extending in a plane perpendicular to the center axis C. They are distributed circumferentially around the connecting part 37 of the driving member 21.

In order to allow the transmission of the rotational torque, the connecting part 37 has at least one flat side 53 (FIG. 3) in the section perpendicular to the center axis C. Typically, the connecting part 37 has as many flat sides 53 in section as there are rotary elements 51, wherein each rotary element rolls along a flat side 53.

In the example shown, the application member 27 comprises four rollers 51 arranged at 90° to each other about the center axis C. Moreover, the connecting part 37 of the driving member 21 has a square section perpendicular to the center axis C. It thus comprises four flat sides 53, perpendicular to each other.

Alternatively, the application member 27 may comprise three rotary elements 51, or five rotary elements 51, or more than five rotary elements 51.

The rotary torque application member 27 is located in or near the central passage 35. The term "near" means that the application member 27 is located along the center axis at a distance less than 50 cm from the rotor 19.

When the application member is not housed in the central passage, it is preferably located under the rotor 19. In a non-preferred variant, it is situated above the rotor 19.

Figure 3:
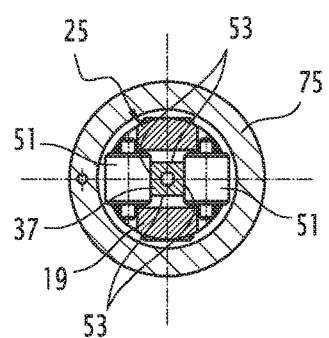
FIG. 3 shows a sectional view according to the arrows III of FIG. 2.

Typically, the rotating elements 51 are arranged in housings formed in the rotor 19, and protrude into the passage 35. This situation is illustrated in FIGS. 2 and 3.

As a result, the peripheral wall 57 delimiting the passage 35 is separated from the connecting part 37 by a gap having a width greater than 10 mm.

Firstly, this has the effect of allowing the circulation of the primary fluid between the drive member 21 and the rotor 19 via the passage 35. This thus reduces the pressure drop for the primary fluid passing through the drive mechanism.

This is also favorable for engine cooling.

Finally, this reduces the hydromechanical resistance when the driving member 21 and the driven member 29 are released in an emergency.

Alternatively, the rotary torque application member 27 does not comprise rotating elements but comprises, for example, one or more pads sliding against the connecting part 37 of the driving member.

The blocking member(s) 33 is/are mounted on a support 59 integral with the rotor 19. The support 59 has a cylindrical shape and internally delimits a conduit 60 placed in the extension of the passage 35.

The blocking device 31 typically comprises a plurality of blocking members 33 distributed circumferentially around the driving member 21.

The blocking device 31 comprises at least one polar mass 61 linked to the blocking member(s) 33, and at least one electromagnetic coil 63 interacting with the polar mass(es) 61.

For example, each blocking member 33 may be a hook that is pivotally mounted on the support 59. The blocking device 31 further comprises a rod 64 for each blocking member 33, which is articulated at one end to one of the polar masses 61, and at its opposite end to the hook 33.

When the electromagnetic coil 63 is activated, it magnetically attracts the polar mass(es) 61 parallel to the center axis, by bearing against a stop formed on the support 59. In this position, the blocking member(s) 33 protrude inside the conduit 60 and are placed in a groove 65 formed in the driving member 21. The groove 65 is located in an intermediate part of the driving member 21, between the driving part and the connecting part.

The groove 65 is delimited upwards by a shoulder 67 bearing against the blocking member(s) 33. The blocking member(s) 33 interact with the shoulder 67 to block the movement of the driving member 21 towards the core 7 parallel to the center axis C.

Furthermore, the blocking device 31 also comprises an elastic member 69, interposed between the driving member 21 and the support 59, and urging the driving member 21 towards the core 7. In the example shown, this elastic member is a helical compression spring.

When the power supply to the coil 63 is cut off, the polar mass(es) 61 is/are no longer held against the stop provided on the support 59. Elastic members rotate the blocking member(s) 33 in order to withdraw them from the conduit 60. This movement is no longer prevented by the polar mass(es) 61 that is/are held electromagnetically against the stop(s). The driving member 21 is then free to move towards the core 7 under the effect of its weight and the urging force applied by the elastic member 69.

It should be noted that the screw 45 and the nut 23 constitute an irreversible connection in the sense that this is provided to prevent vertical stress applied to the driven member 29 being converted by the screw and the nut into a rotational movement of the driving member 21.

Therefore, it is not necessary to permanently maintain a power supply to the stator and rotor in order to lock the control member 9 at its current position.

Each drive mechanism 11 further comprises a guide in the form of a device 71 for guiding the driven member 29 in translation and blocking it in rotation relative to the stator 17. Typically, this device 71 comprises one or more slides 73 for orientation parallel to the center axis C, wherein each slide 73 interacts with a key 74 that is integral with the driven member 23. This device thus makes it possible to prevent the rotation of the driven member 29 when the driving member 21 is rotated by the rotor 19.

Each drive mechanism 11 further comprises an upper frame 75 on which are mounted the motor 15 and the blocking device 31, and a lower frame 77 on which is mounted the device 71 for guiding in translation and blocking in rotation.

The lower frame 77 only carries the device 75 for guiding in translation and blocking in rotation. It may therefore be added in order to facilitate the circulation of the primary liquid. This contributes to reducing the pressure drop and to facilitating the cooling of the motor 15 and the electromagnetic coils 63.

The upper frame 75 and the lower frame 77 are fixed to each other so that the lower frame 77 is closer to the core 7 than the upper frame 75. In fact, the electrical parts, for example the motor, the electromagnetic coils, the electrical connections and the instrumentation are sensitive to nuclear radiation. It is therefore advantageous to locate them remote from the core 7. The lower frame only carries robust mechanical members, and may therefore be advantageously arranged closer to the core 7.

Furthermore, the upper frame 75 and the lower frame 77 are rigidly fixed to each other by removable fasteners. This has the effect of facilitating the maintenance of the drive mechanism 11. The upper frame, which carries the most compact and most fragile elements, may be removed from the vessel independently of the lower frame, and a block.

It should be noted that the driving member 21 is disassembled separately from the upper frame and the lower frame. The driven member 29 is disassembled with the lower frame.

The operation of the nuclear reactor will now be described.

We consider here a starting configuration in which the driving member 21 is locked in translation parallel to the center axis C relative to the rotor 19 by the blocking device 31. This position is called the extreme high position.

In this situation, the electromagnetic coil 63 is activated, so that the polar mass(es) 11 is/are held electromagnetically against the stops provided for this purpose. In the representation of FIG. 2, they are thus attracted upwards.

To move a core reactivity control member 9 downwards or upwards, the stator 17 is activated and rotates the rotor 19. The rotational movement of the rotor 19 is transmitted to the driving member 21 by the connecting device 25, or, more precisely, by the rotary torque application member 27. The rotary elements 51 bear against the sides 53 of the connecting part 37, and transmit the rotary torque of the rotor to the driving member 21.

According to the direction of rotation of the rotor 19, this rotation is converted into a translational movement of the driven part either upwards or downwards and parallel to the center axis C.

In fact, the screw 23 is rotated so that the nut 45 moves in translation along the screw. This causes a displacement of the whole driven member 29, which itself drives the control member 9 in translation parallel to the center axis C. This movement is guided by the guide device 71, wherein the keys 74 slide in slides 73 provided for this purpose.

If it is necessary to rapidly lower the core reactivity control members 9 into the inside the nuclear fuel assemblies, for example in an emergency, the power supply of the electromagnetic coil 63 may be cut off.

The polar mass(es) 61 is/are no longer electromagnetically held against their stop, but are biased in a direction leading to the retraction of the blocking members 33 by the elastic members provided for this purpose. In this situation, the driving member 21 is no longer blocked in translation relative to the rotor 19. The elastic member 69 urges the driving member 21 towards the core 7, wherein the latter in turn drives the driven member 29 by the bias of the screw-nut torque.

The driving member 21 and the driven member 29 thus move together in translation relative to the rotor 19. The connecting part 37 of the driving member 21 moves inside the passage 35.

The stroke in translation of the driving member 21 and the driven member 29 depends on the position of the nut 45 along the screw 23 when the power supply of the coil 63 is cut off. This stroke is maximum when the nut 45 is raised to the maximum along the screw 23, as shown in FIG. 2. The driving member 21 and the driven member 29 then move to an extreme low position.

It should be noted that both in the extreme high position and in the extreme low position, the connecting part 37 of the driving member 21 remains in engagement with the rotary torque application member 27.

More specifically, in the extreme high position, a first section 79 of the connecting part 37 interacts with the rotary torque application member 27, and in the extreme low position a second section 81 of the connecting part interacts with the rotary torque application member 27. The first section 79 is located at the lower end of the connecting part 37, and therefore adjoins the shoulder 67. The second section 81 is located at the upper end of the connecting part 37.

The fall time of the entire driving member/driven member is particularly short. In fact, because the screw-nut connection is released with the driving member and the driven member, the fall is a simple translational movement and not the helical movement of a screw or a nut. The mechanical friction is minimized, especially in the case where the torque application member comprises one or more rotating elements rolling along the connecting part. The hydrodynamic resistance to the falling movement is reduced by the fact that a gap of significant width is created between the rotor and the connecting part of the driving member. Moreover, this hydrodynamic residence only affects the height of the rotor, which is low compared to the height of the driving member or the driven member. Finally, the mass of the driving member and the driven member contributes to accelerate the fall.

After the driving member and the driven member 29 have been released in order to bring the latter to its highest extreme position, the stator 17 is activated in order to rotate the rotor 19 in the direction that would normally move the driven member 29 towards the core, i.e. downwards. Because the driven member 29 is ultimately downwards, this results in a lifting of the driving member 21. When it is detected that the shoulder 67 has reached its initial position, the electromagnetic coil 63 is re-supplied, so that the blocking members 33 pivot and block the driving member 21 in its extreme high position.

The arrival of the shoulder 67 at its initial position may be detected by any means, for example by a limit sensor.

The control of the blocking device is independent of the control of the motor 15 to ensure the raising or lowering of the control member. This is particularly advantageous because the control of the electromagnetic coil 63 of the blocking device is classified at the highest level of safety, which is not the case for the motor control 15.

The drive mechanism has low power consumption, and therefore low heat dissipation, in particular because the maneuvering of the control members requires very little energy, because of the gearing by the screw-nut system. Furthermore, the resetting of the blocking members is effected unloaded, which only requires a low-power electromagnetic coil.

It will again be noted that the air gap between the rotor and the stator or between the polar mass(es) and the electromagnetic coil that moves them does not come into play during the release of the driving member and the driven member, nor in the maintenance of the seal in the device, nor for refrigerating the system. This gap may be reduced to a minimum, so that the electromagnetic coupling is improved and the size and power of the windings are limited.

In addition, the number and volume of jacketed members is particularly small. The jacketed members are those that must be physically isolated from the primary liquid: i.e. the rotor, the stator, and the electromagnetic coil.

What is claimed is:

1. A nuclear reactor comprising:
   a vessel having a center axis and containing a primary liquid;
   a plurality of nuclear fuel assemblies forming a core placed in the vessel;
   a plurality of core reactivity controllers configured for controlling the reactivity of the core;
   a plurality of drive mechanisms configured for driving the core reactivity controllers parallel to the center axis, each drive mechanism comprising:
      a motor comprising a stator and a rotor configured for being rotated by the stator;
      a driving member comprising a driving part forming one of a screw or a nut;
      a connector for rotating connection of the driving member with the rotor, having a torquer for applying a rotational torque of the rotor to the driving member;
      a driven member translationally connected to one of the core reactivity controllers and comprising the other of a screw or a nut, the screw and the nut configured for interacting so that a rotation of the driving member relative to the stator results in a translation of the driven member parallel to the center axis relative to the stator; and
      a blocking device comprising at least one blocker selectively movable between a blocking position in which the drive member is locked in translation parallel to the center axis relative to the rotor, and a releasing position in which the driving member and the driven member are free in translation parallel to the center axis relative to the rotor between an extreme high position and an extreme low position,
      the motor of each drive mechanism being fully immersed in the primary liquid inside the vessel,
      the rotor of each drive mechanism having a central passage, the torquer being located in or close to the central passage;
      the driving member including a connecting part engaged in the central passage and interacting with the torquer, wherein the connecting part is free in translation in the central passage relative to the rotor when the or each blocker is in the releasing position.

2. The nuclear reactor according to claim 1, wherein the connecting part of the driving member comprises a first section interacting with the torquer in the extreme high position, and a second section interacting with the torquer in the extreme low position.

3. The nuclear reactor according to claim 1, wherein the torquer comprises a plurality of rotary elements configured for rolling along the connecting part when the connecting part moves parallel to the center axis.

4. The nuclear reactor according to claim 1, wherein the connecting part has at least one flat side in a section perpendicular to the center axis.

5. The nuclear reactor according to claim 1, wherein the passage is delimited by a peripheral wall separated from the connecting part by a gap with a width greater than 10 mm.

6. The nuclear reactor according to claim 1, wherein the or each blocker is mounted on a support integral with the rotor.

7. The nuclear reactor according to claim 6, wherein the blocking device comprises at least one polar mass connected to the one or more blockers, and at least one electromagnetic coil interacting with the or each polar mass, wherein the or each electromagnetic coil is fixed in translation and in rotation with respect to the stator.

8. The nuclear reactor according to claim 6, wherein the blocking device comprises at least one elastic member interposed between the driving member and the support, the at least one elastic member urging the driving member to the extreme low position.

9. The nuclear reactor according to claim 1, wherein each drive mechanism comprises a guide configured for guiding the driven member in translation and blocking the driven member in rotation relative to the stator.

10. The nuclear reactor according to claim 9, wherein each drive mechanism comprises an upper frame on which are mounted the motor and the blocking device, and a lower frame on which is mounted the device for translational guiding and rotational blocking, wherein the upper and lower frames are removably attached to one another so that the lower frame is closer to the core than the upper frame.

11. The nuclear reactor according to claim 1, wherein the screw and the nut constitute an irreversible connection, arranged such that a vertical bias applied to the driven member is not converted into a rotational movement of the driving member.

* * * * *